United States Patent [19]

Ananias

[11] 3,792,364

[45] Feb. 12, 1974

[54] METHOD AND APPARATUS FOR DETECTING ABSOLUTE VALUE AMPLITUDE OF AM SUPPRESSED CARRIER SIGNALS

[75] Inventor: James W. Ananias, Springfield, Ill.

[73] Assignee: Sangamo Electric Company, Springfield, Ill.

[22] Filed: Aug. 3, 1972

[21] Appl. No.: 277,634

[52] U.S. Cl. .................... 329/50, 178/88, 325/320, 328/134, 329/145, 329/104, 332/44

[51] Int. Cl. .................... H03d 1/52, H04l 27/22

[58] Field of Search ...... 329/50, 145, 104; 325/329, 325/330, 467, 320; 328/134; 332/44, 45 R, 45 A; 178/88

[56] References Cited

UNITED STATES PATENTS

| | | | |
|---|---|---|---|
| 3,501,691 | 3/1970 | Ernst | 329/50 X |
| 3,493,876 | 2/1970 | Zimmerman | 329/50 X |
| 3,500,217 | 3/1970 | Allen | 329/145 X |
| 3,652,872 | 3/1972 | Miller | 328/134 X |
| 3,122,704 | 2/1964 | Jones | 328/134 X |
| 3,320,552 | 5/1967 | Glasser | 329/50 X |
| 3,035,231 | 5/1962 | Neelands et al. | 329/145 X |

*Primary Examiner*—Alfred L. Brody

[57] ABSTRACT

Apparatus for detecting the absolute value amplitude of amplitude modulated suppressed carriers includes first and second product detectors which use quadrature phases of a locally generated reference carrier to product detect the modulated carrier producing first and second vector components of the amplitude of the information signal, and an output circuit for obtaining the vector sum of the two components of the information signal amplitude to thereby provide a signal which is proportional to the absolute value amplitude of the information signal. In one embodiment, the vector sum of the two components of the information signal amplitude is obtained by amplitude modulating quadrature phases of a high frequency carrier in separate amplitude modulators, summing the amplitude modulated signals thus produced, and demodulating the resultant signal to translate the high frequency carrier back to the base-band and thereby recover the amplitude information.

14 Claims, 7 Drawing Figures

METHOD AND APPARATUS FOR DETECTING ABSOLUTE VALUE AMPLITUDE OF AM SUPPRESSED CARRIER SIGNALS

BACKGROUND OF THE INVENTION

1. Field of the Invention

This invention relates to modulated data transmission systems, and more particularly, to methods and apparatus for detecting the absolute value amplitude of AM suppressed carrier signals.

2. Description of the Prior Art

In one method for extracting an information signal from an AM suppressed carrier, a product detector circuit is used to multiply the modulated carrier by a reference carrier to obtain a signal representative of the amplitude of the information signal. However, in prior art synchronous product detection modulation schemes, the frequency of the reference carrier signal must be the same as the frequency of the modulated carrier signal. In addition, the reference carrier signal must have a phase which is fixed with respect to possible phases of the modulated carrier, since the quality of the reproduced information signal depends on both the frequency and phase relationship of the reference carrier signal and the modulated carrier signal.

If the frequency and phase constraints on the reference carrier are not met, the recovered information signal will be degraded in varying degrees. For example, if the frequency of the reference carrier is not the same as the frequency of the modulated carrier, the recovered baseband waveform will be totally useless. On the other hand, if the phase of the reference carrier varies relative to the phase of the modulated carrier, the baseband waveform will be degraded by an amount which is proportional to the difference in phase between the reference carrier and the modulated carrier.

Thus in these prior art synchronous product detection systems, it is essential that the frequency and phase of the reference carrier be the same as the phase and frequency of the modulated carrier to provide satisfactory reproduction of the information signals which modulate the carrier signal. However, it is well known that frequency and phase deviations frequently occur as a result of phase jitter or frequency offset which may occur in the transmission path, modifying the modulated carrier during transmission.

To compensate for this problem, certain known synchronous product detection systems employ pilot tones for expediting demodulation of the transmitted carrier to recover transmitted data. The pilot tones are derived from the transmitted carrier at the transmitting end and transmitted along with the modulated carrier to the demodulator circuit at the receiving end. However, such systems require separate modulating and demodulating circuits for the pilot tones.

In addition if pilot tones are used, there is less energy alloted for the modulated carrier, since the total transmission line signal energy must remain fixed. Thus, for a given constant transmission line noise level, the resulting signal-to-noise ratio of the line signal at the receiving end is lower when pilot tones are used.

SUMMARY OF THE INVENTION

The present invention provides a method and apparatus for detecting the absolute value amplitude of AM suppressed carrier signals wherein the frequency and phase of the reference carrier used in the detection of the information modulating signal on a modulated carrier may be asynchronous with the phase and frequency of the modulated carrier.

The system provided by the present invention employs two product detectors which receive reference carriers of the same frequency but at a preselected phase difference. One of the product detectors provides one component of the demodulated information vector signal and the other product detector provides the other component of the vector signal. The two signal outputs of the two product detectors are then combined producing the vector sum of the product demodulator outputs such that the resulting signal represents the absolute value amplitude of the baseband information signal.

In accordance with one embodiment of the invention, an AM detector circuit includes first and second product detector means, each including analog multiplier means. A modulated carrier signal is fed to an input of each of the analog multiplier means of the first and second product detector means. A zero degree phase reference carrier signal is fed to a second input of the analog multiplier means of one of the product detector means, and a further reference carrier signal, which is 90° out of phase with the 0° phase reference carrier, is fed to a second input of the analog multiplier of the second product detector means.

The analog multiplier means of the first product detector means is operable to provide an output signal representing product of the 0° phase reference carrier and the modulated carrier, which output signal is passed over filter means of the product detector means which passes only a low frequency component of the output signal provided by the analog multiplier means providing a signal $KA(t) \cos \theta$, where $A(t)$ represents the amplitude of the information signal and $\theta$ is the difference in phase between the instantaneous modulated carrier and the 0° phase reference carrier.

Similarly, the second product detector means provides an output signal representing the product of the modulated carrier signal and the 90° phase reference carrier signal which can be represented as $KA(t) \sin \theta$.

The output signals of the two product detector means are then used to amplitude modulate a high frequency signal in separate amplitude modulator means. The output signal $KA(t) \cos \theta$ of the first product detector means is passed to a first amplitude modulator means to modulate a first high frequency signal $D \cos \omega_H t$ providing an output signal $KA(t) D \cos \theta \cos \omega_H t$. Similarly, the output signal $KA(t) \sin \theta$ of the second product detector means is passed to a second amplitude modulator means to amplitude modulate a second high frequency signal $D \cos(\omega_H t + \pi/2)$, which is 90° out of phase with the first high frequency signal, to provide an output $KA(t) D \sin \theta \cos(\omega_H t + \pi/2)$.

The output signal provided by the first and second amplitude modulator means are combined by summing means and the resultant signal, representing the vector sum of the amplitude information signals, is fed to amplitude demodulator means which provides an output signal $K' |A(t)|$ representing the absolute value amplitude of the information signal.

One advantage of the AM suppressed carrier detection apparatus provided by the present invention is that the locally injected reference carrier signals need not be frequency and phase locked to the modulated carrier to obtain the absolute value amplitude of the information signal. This is possible because of the use of two product detector means, each of which detects one component of the aboslute value vector for the information signal. Accordingly, reference carrier signals derived from the transmitted carrier are not required and thus, pilot tones need not be transmitted over the communication line from the transmitting end to the demodulator at the receiving end. Consequently, a greater portion of the line bandwidth is available for data transmission and a higher signal to noise ratio is achieved by the system of the present invention.

In accordance with a feature of the invention, rectifier means may be included between the output of each of the product detector means and the associated amplitude modulator means to provide full-wave rectification of the signal outputs of the two product detector means. Accordingly, amplitude modulation of the high frequency signals will be limited to a maximum of 100 percent thereby eliminating abrupt phase reversals when the amplitude modulated high frequency signals are added to obtain the vector sum of the two components of the information signal. Such phase reversals could result in degradation of the recovered information signal.

Further objects and advantages of the present invention will become apparent in the following detailed description which makes reference to the following drawings.

DESCRIPTION OF PREFERRED EMBODIMENTS

In prior art synchronous product detection systems, the frequency of the locally injected reference carrier must be the same as the frequency of the modulated carrier. In addition, the locally injected reference carrier must be in phase or in phase opposition with the instantaneous modulated carrier phase in order to recover the maximum amplitude information signal without distortion.

Figure 1:
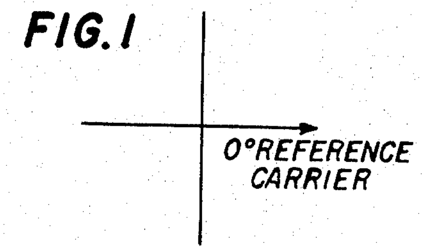
FIGS. 1 and 1*a* are vectorial representations of reference carrier signals necessary for use in systems for demodulating a modulated carrier of two or four discrete phases, respectively.
Figure 1A:
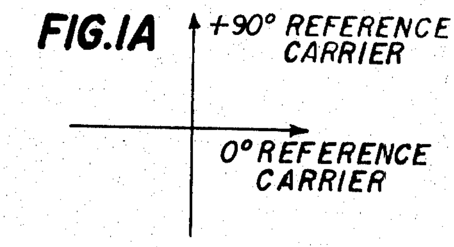
Figures 2, 2A:
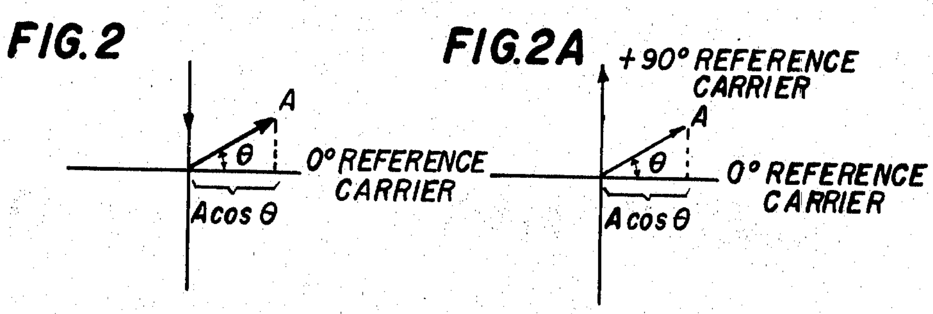
FIGS. 2 and 2*a* are vectorial representations of the reference carrier signals of FIGS. 1 and 1*a*, respectively, and a demodulated information signal obtained from a modulated carrier when the phase of the reference carriers differ from the phase of the modulated carrier.

Referring to FIGS. 1 and 1*a*, there are shown vectorial representations of reference carrier signals for use in systems for demodulating a modulated carrier wave of two or four discrete phases, respectively. In either case, if the phase of the reference carrier differs from the instantaneous phase of the modulated carrier by an angle $\theta$, as illustrated in FIGS. 2 and 2*a*, for example, the demodulated information signal, nominally of amplitude "A" will be recovered with an amplitude A cos $\theta$. This reduction in amplitude of the recovered information signal results in degraded system performance in the presence of noise.

Figure 3:
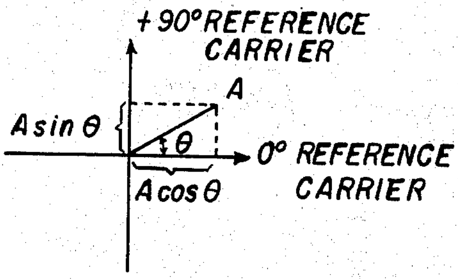
FIG. 3 is a vectorial representation of the reference carriers of FIG. 1a and two components of the absolute value amplitude of an information signal obtained from a modulated carrier in accordance with present invention.

In accordance with the present invention, the modulated carrier is product detected in two separate product detectors which have locally injected reference carrier signals of the same frequency but of different phases. For example, one reference carrier may be shifted 90° from the other reference carrier. Accordingly, as shown in FIG. 3, the two product detectors provide two components A cos $\theta$,A sin $\theta$ of the instantaneous value "A" of the amplitude of the information signal, permitting the absolute value "A" of the amplitude of the information signal to be obtained.

Figure 4:
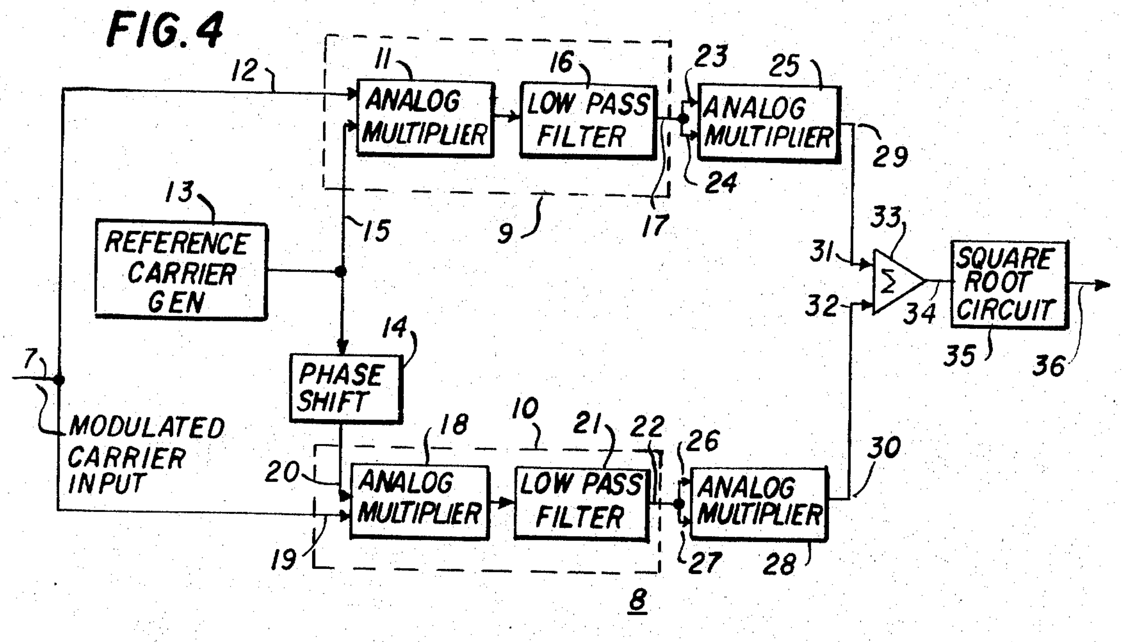
FIG. 4 is a block diagram of an AM suppressed carrier demodulator circuit provided in accordance with one embodiment of the invention.

Referring to FIG. 4, there is shown a block diagram of one embodiment for an AM suppressed carrier demodulator circuit 8 provided by the present invention. The demodulator circuit 8 may, for example, be used in a combined amplitude modulation-phase shift keyed data transmission system to recover digital data modulated onto a voice frequency carrier and transmitted from a data source to the demodulator circuit over a voice frequency transmission line. The instantaneous modulated carrier signal may be represented by the relationship A $(t)$ cos $(\omega_c t + \theta)$, where A$(t)$ describes the carrier envelope,representing at any given time, phase or amplitude information being transmitted, $\omega_c$ represents the frequency of the carrier signal which, for example, may be 1800 Hz, and $\theta$ represents the phase angle of the carrier signal.

The demodulator circuit 8 includes two product detectors 9 and 10 operable to obtain two components of the transmitted information signal as will become apparent. Product detector 9 includes an analog multiplier circuit 11 having a first input 12 connected to the transmission line 7 to receive the modulated carrier, and a second input 15 connected to an output of a local reference carrier generating circuit 13 to receive an 0° reference carrier, which may be a sinusoidal signal represented as B cos $_c t$, where B represents the amplitude of the reference carrier and $\omega_c$ represents the frequency of the reference carrier which may, for example, be 1800 Hz.

While in an exemplary embodiment the injected reference carrier is assumed to be of the same frequency as the modulated carrier, the frequency of the reference carrier may be different from the frequency of the modulated carrier. Moreover, the reference carrier may also be a square wave of a predetermined frequency, such as 1800 Hz.

The analog multiplier circuit 11 provides the product of the modulated carrier A$(t)$ cos$(\omega_c t + \theta)$supplied over input 12 and the 0° phase reference carrier B cos$\omega_c$t supplied over input 15. The resulting output signal KA$(t)$ [cos $(2\,\omega_c t + \theta) +$ cos $\theta]$ is passed over a low pass filter 16 of product demodulator 9 which filters out the higher frequency component, providing a signal KA$(t)$ cos $\theta$ at an output 17 of product detector 9.

The signal output KA$(t)$ cos $\theta$ of product detector 9 at output 17 is extended to a pair of inputs 23 and 24 of an analog multiplier circuit 25 which provides a signal $[\text{KA}(t)]^2\cos^2\theta$, representing the square of the signal provided at output 17 of the product detector 9.

Similarly, product detector 10 includes an analog multiplier circuit 18 which has a first input 19 connected to transmission line 7 to receive the modulated carrier signal, and a second input 20 connected over a phase shift circuit 14 to the output of the reference carrier signal generator 13 to receive a 90° phase reference carrier signal B sin $\omega_c t$ at a frequency of 1800 Hz, which is shifted in phase 90° from the 0° phase reference carrier supplied to product detector 9. The analog multiplier circuit 18 provides the product of the modulated carrier $A(t) \cos(\omega_c t + \theta)$ received over input 19 and the injected locally generated 90° phase reference carrier B sin $\omega_c t$ received over input 20. The resulting signal $KA(t)[\cos(2\omega_c t + \theta) + \sin \theta]$ is passed over a low pass filter circuit 21 of product detector 10 which filters out the higher frequency signal to provide an output signal $KA(t) \sin \theta$ at an output 22 of product detector 10.

The signal $KA(t) \sin \theta$ provided at output 22 of the product detector 10 is extended to separate inputs 26 and 27 of an analog multiplier 28 which provides an output $[KA(t)]^2 \sin^2 \theta$ representing the square of the signal provided at output 22 of product detector 10. The output signal provided by analog multiplier 25 and the output signal provided by analog multiplier 28 are extended to separate inputs 31 and 32 of a summing circuit 33 which provides an output $[KA(t)]^2 \cos^2 \theta + [KA(t)]^2 \sin^2 \theta$ or $[KA(t)]^2$ representing the sum of the signals provided at the outputs 29 and 30 of analog multipliers 25 and 28, respectively.

The output of the summing circuit 33 at 34 is extended to a square root circuit 35 which provides an output $K'|A(t)|$ at 36 representing the absolute value of the signal provided at the output 34 of the summing circuit, which signal is proportional to the absolute value amplitude of the information signal.

Thus, the demodulating circuit 8 employs two product detector 9 and 10 which provide two components, $KA(t) \cos \theta$ and $KA(t) \sin \theta$, respectfully, of the modulated carrier, and the two components of the modulated carrier are used to obtain a signal representing the absolute value of the information signal.

Figure 5:
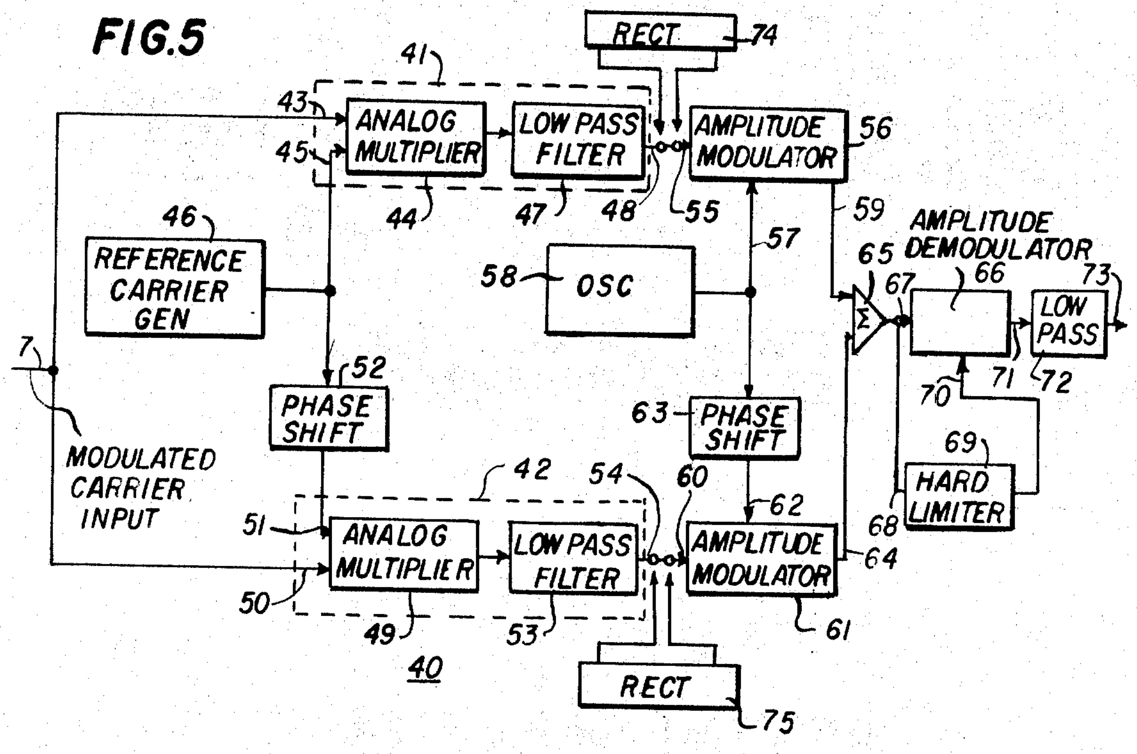
FIG. 5 is a block diagram of an AM suppressed carrier demodulator circuit provided in accordance with a second embodiment of the invention.

Referring to FIG. 5, there is shown a block diagram of a further embodiment for a demodulating circuit 40 provided by the present invention for recovering the aboslute value of an information signal from a modulated carrier. The demodulating circuit 40 includes a pair of product detector circuits 41 and 42. Product detector circuit 41 includes an analog multiplier 44 having a first input 43 connected to a transmission line 7 to receive the modulated carrier signal $A(t) \cos(\omega_c t + \theta)$ and a second input 45 connected to an output of a reference carrier signal generator 46 which provides a reference carrier signal B cos $\omega_c t$ which may be at a frequency of 1800 Hz.

The analog multiplier 44 provides an output signal representative of the product of the modulated carrier and the reference carrier. The resulting output signal $KA(t)[\cos(2\omega_c t + \theta) + \cos\theta]$ is passed over a low pass filter circuit 47 of product detector 41 which filters out the higher frequency component of the signal providing a signal $KA(t) \cos \theta$ at an output 48 of the product detector circuit 41.

Similarly, product detector 42 includes an analog multiplier circuit 49 having a first input 50 connected to the transmission line 7 to receive the modulated carrier signal $A(t) \cos(\ \ _c t + \theta)$. The analog multiplier circuit 49 has a second input 51 connected over a phase shift circuit 52 connected to an output of the reference signal generator 46 to receive a 90° phase reference carrier B sin $\omega_c t$ which is of the same frequency as (but shifted 90° from) the reference signal supplied to product detector 41.

The analog multiplier circuit 49 provides an output signal representing the product of the modulated carrier and the injected 90° phase reference carrier. The resulting signal output $KA(t)[\cos(2\omega_c t + \theta) + \sin \theta]$ is passed over a low pass filter 53 of product detector 42 which filters out the higher frequency component to provide a signal $KA(t) \sin \theta$ at output 54 of the product detector circuit 42.

In demodulating circuit 40, the vector sum of the two components $KA(t) \cos \theta$ and $KA(t) \sin \theta$ of the amplitude information signal are obtained by amplitude modulating two high frequency signals, one of which is shifted 90° from the other. Accordingly, the signal $KA(t) \cos \theta$ provided at the output 48 of the product detector 41 is extended to a first input 55 of an amplitude modulator 56. A second input 57 of the amplitude modulator is connected to an output of a high frequency generator 58 which provides a signal D cos $\omega_H t$ which, by way of example, may be of a frequency 25.8 KHz. The amplitude modulator 56 provides an output $K''A(t) \cos \theta \cos \omega_H t$ at an output 59.

Similarly, the output signal $KA(t) \sin \theta$ provided by product detector 42 is extended to a first input 60 of an amplitude modulator 61. Amplitude modulator 61 has a second input 62 connected over a phase shift circuit 63 to an output of the high frequency generator 58 to receive the high frequency signal D $\cos(\omega_H t + \pi/2)$ from signal generator 58 which is of the same phase, but shifted 90° from the high frequency carrier supplied to amplitude modulator 56. Accordingly, amplitude modulator 61 provides an output signal $K'' A(t) \sin \theta \cos -(\omega_H t + \pi/2)$ at an output 64.

The output signals $K'' A(t)[\cos \theta \cos \omega_H t]$ and $K''A(t)[\sin \theta \cos(\omega_H t + \pi/2)]$provided by amplitude modulators 56 and 61 are added in a summing circuit 65, and then demodulated by amplitude demodulator 66 to translate the high frequency wave back to the base-band and recover the amplitude information.

The signal $K'' A(t)[\cos \theta \cos \omega_H t + \sin \theta \cos(\omega_H t + \pi/2)]$ provided at the output of the summing circuit 65 is extended to a first input 67 of the amplitude demodulator 66 and also to an input 68 of a hard limiter circuit 69. The output of the hard limiter circuit 69 is connected to a second input 70 of the amplitude demodulator circuit 66.

The limiter circuit 69 is responsive to the signal supplied over input 68 to provide a square wave output signal at the input 70 of the demodulator 66 which is of a constant amplitude and of the same frequency and phase as the modulated high frequency carrier extended to the other input 67 of the demodulator 66. By mixing the constant amplitude signal provided by the hard limiter circuit 69 with the modulated high frequency carriers in the demodulator circuit 66, the amplitude envelope is recovered from the modulated high frequency carrier. The resulting signal $K' A(t)[\cos(2\omega_H t + \theta) + \cos 0°]$ provided at the output 71 of the demodulating circuit 55 is passed over a low pass filter circuit 72 which filters out the higher frequency component providing a signal $K'|A(t)|$ at output 73 of the filter circuit 72, which is proportional to the absolute value amplitude information of the modulated carrier received by the demodulating circuit 40.

Since only absolute value amplitude information is recovered at the output 73 of the demodulator circuit 40, full wave rectifier circuits, such as circuits 74 and 75, may be inserted between the outputs 48 and 54 of the product detectors 41 and 42, respectively, and the inputs 55 and 60 of the amplitude modulators 56 and 61 respectively, to limit the high frequency amplitude modulation provided by amplitude modulators 56 and 61 to less than or equal to 100 percent. Consequently, abrupt phase reversals will be eliminated when the outputs of the amplitude modulators 56 and 61 are added in the summing circuit 65.

Although the demodulator circuit 40 provides only the magnitude of the amplitude information and not the polarity, the polarity information may be obtained from the original in-phase product demodulator. However, if the original modulated carrier received at the input of the demodulator circuit 40 is less than 100 percent modulated, the polarity information is immaterial.

I claim:

1. In a signal detecting circuit for detecting the amplitude envelope of a modulated carrier which is amplitude modulated with an information signal, means responsive to said modulated carrier and a first reference carrier to provide a first signal representing a vector component of the instantaneous amplitude of the information signal, means responsive to said modulated carrier and a second reference carrier to provide a second signal representing a further vector component of the instantaneous amplitude of the information signal, first means for combining the first and second signals to provide an output signal representing the vector sum of said first and second signals, and second means responsive to said output signal to provide a signal which is proportional to the absolute value amplitude of the information signal.

2. A signal detecting circuit as set forth in claim 1 which includes reference carrier means for providing first and second reference carriers which are of the same frequency as the modulated carrier.

3. A signal detecting circuit as set forth in claim 1 which includes reference carrier means for providing first and second reference carriers which are of a predetermined frequency which is different from the frequency of said modulated carrier.

4. In a signal detecting circuit for detecting the amplitude envelope of a modulated carrier which is amplitude modulated with an information signal, reference carrier means for providing quadrature phases of a reference carrier, first product detector means responsive to said modulated carrier and a reference carrier of a first phase provided by said reference carrier means to provide a first signal representing a first vector component of the amplitude of the information signal, second product detector means responsive to said modulated carrier and a reference carrier of a second phase provided by said reference carrier means to provide a second signal representing a second vector component of the amplitude of the information signal, and output means including first means for providing an output signal representing the vector sum of the first and second signals provided by said first and second product detector means and second means responsive to said output signal to provide a signal proportional to the absolute value amplitude of the information signal.

5. A signal detecting circuit as set forth in claim 4 wherein said reference carrier means includes signal generating means for providing a reference carrier of the same frequency as the frequency of the modulated carrier.

6. A signal detecting circuit as set forth in claim 4 wherein said first means includes first analog multiplier means responsive to said first signal to provide a signal representing the square of the value of said first component of the amplitude of the information signal, and second analog multiplier means responsive to the second signal to provide a signal representing the square of the value of the second component of the amplitude of the information signal, and summing means for summing the signals provided by said first and second analog multiplier means, and wherein said second means includes means for obtaining the square root of the sum of the signals provided by said first and second analog multiplier means.

7. In a signal detecting circuit for detecting the amplitude envelope of a modulated carrier which is amplitude modulated with an information signal, reference carrier means for providing quadrature phases of a reference carrier, first product detector means responsive to said modulated carrier and a reference carrier of a first phase provided by said reference carrier means to provide a first output signal representing a first vector component of the amplitude of the information signal, second product detector means responsive to said modulated carrier and a reference carrier of a second phase provided by said reference carrier means to provide a second output signal representing a second vector component of the amplitude of the information signal, further reference carrier means for providing quadrature phases of a further reference carrier, first modulator means for amplitude modulating a reference carrier of a first phase provided by said further reference carrier means with the first output signal to provide a first amplitude modulated signal which is related to the amplitude of the information signal, second modulator means for amplitude modulating a reference carrier of a second phase provided by said further reference carrier means with the second output signal to provide a second amplitude modulated signal which is related to the amplitude of the information signal, summing means for summing the amplitude modulated signals provided by said first and second modulator means to provide a signal representing the vector sum of the first and second output signals provided by said first and second product detector means, respectively, and demodulating means for demodulating the signal provided by said summing means to provide a signal proportional to the absolute value of the amplitude of the information signal.

8. A detecting circuit as set forth in claim 7 wherein said demodulating means includes amplitude demodulator means having a first input connected to the output of said summing means to receive a signal representing the vector sum of the product demodulator outputs provided by said summing means and limiter means having an output connected to a second input of said amplitude demodulator means for supplying to said amplitude demodulator means a constant amplitude signal of the same phase and frequency as the signal supplied to said amplitude demodulator means by said summing means.

9. A signal detecting circuit as set forth in claim 8 which includes first rectifier means interposed between said first product detector means and said first modulator means, second rectifier means interposed between said second product detector means and said second modulator means, said first and second rectifier means being operable to limit the amplitude modulation provided by said first and second modulator means to less than or equal to 100 percent.

10. In a signal detecting circuit for detecting the amplitude envelope of an amplitude modulated suppressed carrier, reference carrier means for providing quadrature phases of a reference carrier, first product detector means responsive to the modulated carrier signal and a zero degree phase reference carrier provided by said reference carrier means to provide a first signal $A(t) \cos \theta$, where $A(t)$ represents the amplitude of the information signal and $\theta$ represents the phase angle between the modulated carrier and the reference carrier, second product detector means responsive to the modulated carrier and a ninety degree phase reference carrier provided by said reference carrier means to provide a second signal $A(t) \sin \theta$, and output means including first means for combining said first and second signnals to provide an output signal representing the vector sum of said first and second signals, and second means responsive to said output signal to provide a signal $K |A(t)|$, which is proportional to the absolute value amplitude of the information signal.

11. A method of recovering an information signal from an amplitude modulated suppressed carrier comprising the steps of using a zero degree phase reference carrier for product detecting the modulated carrier in first product detector means to provide a first signal $A(t) \cos \theta$, where $A(t)$ represents the amplitude of the information signal and $\theta$ represents the phase angle between the reference signal and the modulated carrier, using a ninety degree phase reference carrier for product detecting the modulated carrier in second product detector means to provide a second signal $A(t) \sin \theta$ which is related to the amplitude of the information signal, combining the first and second signals thus provided to obtain an output signal representing the vector sum of the first and second output signals and deriving from said output signal a signal $K |A(t)|$ which is proportional to the absolute value amplitude of the information signal.

12. A method as set forth in claim 11 wherein the step of combining the first and second signals includes obtaining the square of the first and second signals to provide third and fourth signals, and obtaining the square root of the sum of the third and fourth signals.

13. The method as set forth in claim 11 wherein the step of combining the first and second signals includes using the first and second signals to amplitude modulate quadrature phases of a further reference carrier to provide first and second amplitude modulated signals, combining the first and second amplitude modulated signals, and demodulating the sum of the first and second amplitude modulated signals.

14. A method as set forth in claim 13 wherein the step of demodulating the sum of the first and second amplitude modulated signals includes deriving from the sum of the first and second amplitude modulated signals a constant amplitude reference signal of the same frequency and phase as the amplitude modulated signals, and using the constant amplitude reference signal to recover the amplitude information from the sum of the first and second amplitude modulated signals.

* * * * *